US008104555B2

(12) United States Patent
Pekarsky et al.

(10) Patent No.: US 8,104,555 B2
(45) Date of Patent: Jan. 31, 2012

(54) ELECTRO-MECHANICAL PUMP FOR AN AUTOMATIC TRANSMISSION

(75) Inventors: Lev Pekarsky, W. Bloomfield, MI (US); Mark R. Dobson, Howell, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 659 days.

(21) Appl. No.: 12/261,098

(22) Filed: Oct. 30, 2008

(65) Prior Publication Data

US 2010/0108426 A1 May 6, 2010

(51) Int. Cl.
*B60W 10/08* (2006.01)

(52) U.S. Cl. ........................ 180/65.285; 903/930; 477/5

(58) Field of Classification Search ............... 180/65.21, 180/65.265, 65.28, 65.285, 306.307; 903/930, 903/951; 477/3, 5, 6; 475/5, 8
See application file for complete search history.

(56) References Cited

U.S. PATENT DOCUMENTS 4,441,573 A 4/1984 Carmen et al.
4,702,083 A 10/1987 Nakamura et al.
5,474,428 A * 12/1995 Kimura et al. .................. 417/16
5,993,169 A * 11/1999 Adachi et al. ................. 417/223
6,119,802 A 9/2000 Puett, Jr.
6,306,057 B1 10/2001 Morisawa et al.
6,443,277 B1 9/2002 Taylor et al.
6,453,864 B1 9/2002 Downs et al.
6,460,500 B1 * 10/2002 Ooyama et al. ............ 123/179.3
6,612,386 B2 9/2003 Tamai et al.
6,615,786 B2 9/2003 Mori et al.
6,685,437 B2 2/2004 Koenig et al.
6,964,631 B2 * 11/2005 Moses et al. ....................... 477/3
7,147,239 B2 12/2006 Teslak et al.
7,649,286 B2 * 1/2010 Manning ......................... 310/41
7,828,096 B2 * 11/2010 Hoher et al. ................. 180/65.6
2006/0244263 A1 11/2006 Manning
2007/0087884 A1 4/2007 Janssen

* cited by examiner

*Primary Examiner* — John Walters

(74) *Attorney, Agent, or Firm* — David B. Kelley, Esq.; MacMillan, Sobanski & Todd, LLC

(57) ABSTRACT

A drive system for a motor vehicle transmission includes a hydraulic pump including a shaft, an engine, a starter/alternator connected to the shaft, and a drive mechanism for transmitting torque from the engine to the shaft, and for amplifying torque produced by the starter/alternator and transmitting the amplified torque to the engine.

16 Claims, 4 Drawing Sheets

ELECTRO-MECHANICAL PUMP FOR AN AUTOMATIC TRANSMISSION

BACKGROUND OF THE INVENTION

1. Field of the Invention

This invention relates generally to an automatic transmission for a motor vehicle, and, more particularly, to a hydraulic pump for the transmission driven by an electric motor and engine.

2. Description of the Prior Art

Current automatic transmissions having hydraulically actuated clutches and brakes for controlling the gearing use a hydraulic pump to pressurize and pump fluid to the control elements. Typically the pump is driven directly by an engine via a mechanical coupling.

Such pumps can be broadly divided into fixed displacement pumps (FDP) and variable displacement pumps (VDP). Fixed displacement pumps deliver a constant volume of fluid per revolution and the total volume per unit of time is directly proportional to its speed. Fixed displacement pumps produce a flow rate that is set at minimum engine speed based on a required system flow rate. As a result, at higher speeds, excess fluid flow must be return to an oil sump or recirculated to the pump inlet. The excess flow decreases the operating efficiency of the transmission.

The fluid displacement per revolution of a variable displacement pump can be adjusted to deliver a variable flow rate, i.e., the volume of fluid per unit of time, e.g. liters per minute, at a constant speed.

Variable displacement pumps typically used in automotive applications are variable displacement vane pumps, whose displacement is adjusted by a control system as fluid flow requirements are met. Excess flow generated by the pump is utilized to actuate the pump's control, which adjusts the eccentricity of a control ring relative to the vanes.

Such control mechanisms have limited capability to adjust flow rate. This limitation is realized at maximum transmission speed, at which the eccentricity cannot be further decreased, yet the pump is still providing flow in excess of the transmission system's requirements. Excess flow, under these conditions is exhausted to sump, thereby adversely affecting the pump's mechanical efficiency and vehicle fuel economy.

Changes in the flow rate due to transient conditions, such as gear or pressure changes, can occur within milliseconds, but the response delay of a VDP displacement adjusting mechanism typically cannot match the change in flow rate demand. As result, VDPs must be oversized to handle transient flow demands.

An ideal pumping system using an electric motor with variable speed control and a pump is not practical in an automatic transmission that operates over a wide range of operating conditions including cold start-ups that require high torque. The high torques in cold temperature operation would require high power current supply.

An ideal pump, i.e., a pump consuming the minimum energy, should have infinitely variable flow rate depending on system flow demand, which is defined as the instantaneous fluid flow rate that is required to satisfy hydraulic system functions such as, but not limited to cooling, clutch actuations, lubrication, leakages. System flow demand can be further divided into steady state and transient demands. Flow demand generally depends on fluid temperature, viscosity, circuit pressure and other operating conditions. Transmission system flow demand is independent of pump flow delivery.

SUMMARY OF THE INVENTION

A drive system for a motor vehicle transmission includes a hydraulic pump including a shaft, an engine, a starter/alternator connected to the shaft, and a drive mechanism for transmitting torque from the engine to the shaft, and for amplifying torque produced by the starter/alternator and transmitting the amplified torque to the engine.

The system can be used with a conventional transmission driven by a gasoline or diesel engine and eliminates a separate belt driven alternator and starter by using one internally packaged unit that provide three functions: pumping, generation and engine starting and is packaged internally. The system can be used to generate electric current, eliminating a belt driven externally mounted alternator. When electrical power is not being used to drive the pump, the unit could be used to reverse the flow of energy and charge the battery.

The system reduces weight and improves engine efficiency. The electric pump improves fuel economy by (a) closely matching transmission flow demand with pump flow delivery, and (b) maintaining hydraulic pressure and transmission function when the engine is not operating, which permits an engine shut down strategy when the vehicle is stopped.

The drive system can be used as an engine start up device, eliminating an externally mounted starter. To enable engine start up functions, novel hydraulic and electronic actuator arrangements predicatively control transmission flow demand and pump flow rate.

The scope of applicability of the preferred embodiment will become apparent from the following detailed description, claims and drawings. It should be understood, that the description and specific examples, although indicating preferred embodiments of the invention, are given by way of illustration only. Various changes and modifications to the described embodiments and examples will become apparent to those skilled in the art.

DESCRIPTION OF THE DRAWINGS

The invention will be more readily understood by reference to the following description, taken with the accompanying drawings, in which.

DESCRIPTION OF THE PREFERRED EMBODIMENT

Figure 1:
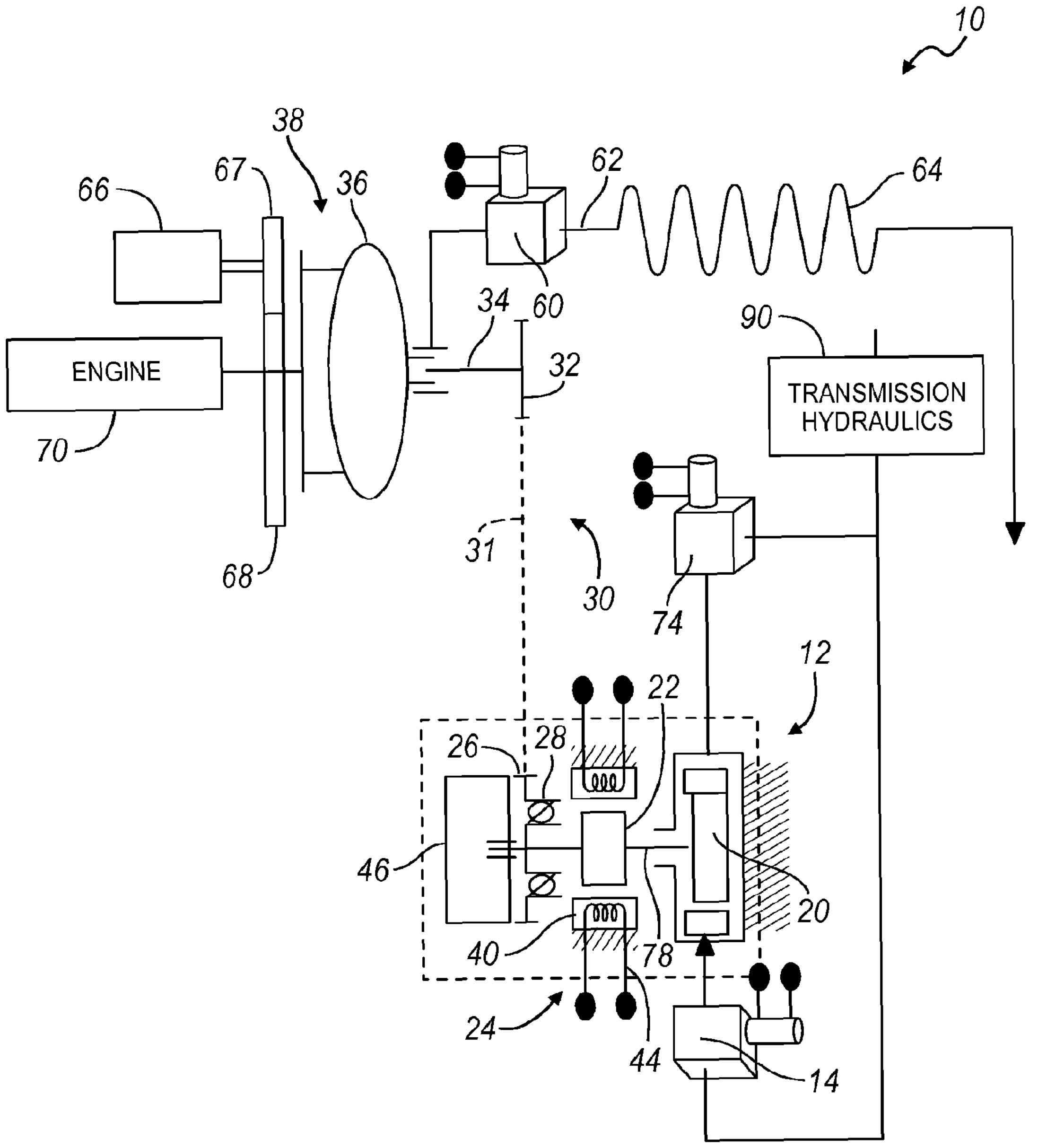
FIG. 1 is a schematic diagram of a transmission hydraulic system showing a pump, electric motor and controls.

Referring now to the drawings, there is illustrated in FIGS. 1-4 a system 10 that includes a transmission pump and related controls. The system 10 includes a variable displacement hydraulic vane pump 12, whose displacement is controlled by a hydraulic valve and variable force solenoid 14. Pump 12 is supplied with fluid at transmission line pressure, whose magnitude is controlled by an independent control system that includes a main regulator valve 16, which is fed by flow from pump 12, and a line pressure control solenoid (not shown).

The rotor 20 of pump 12 is mechanically connected by a coupling to the rotor 22 of an electric motor/alternator 24. The pump rotor 20 is also connected to a pulley 26 through one way clutch (OWC) 28. A drive mechanism 30 includes a chain or belt 31 engaged with pulleys 26, 32.

Pulley 32 is secured to an input shaft 34, which is coupled to the impeller 36 of hydrokinetic torque converter 38. The torque converter 38 contains a bladed impeller wheel 36 continually driveably connected to the engine 70, a bladed turbine wheel driven by fluid exiting the impeller blades and driveably connected to input shaft 34, and a bladed stator wheel arranged in a flow path between the impeller and turbine. The pump 12 is running while the engine 70 is running.

Figure 2:
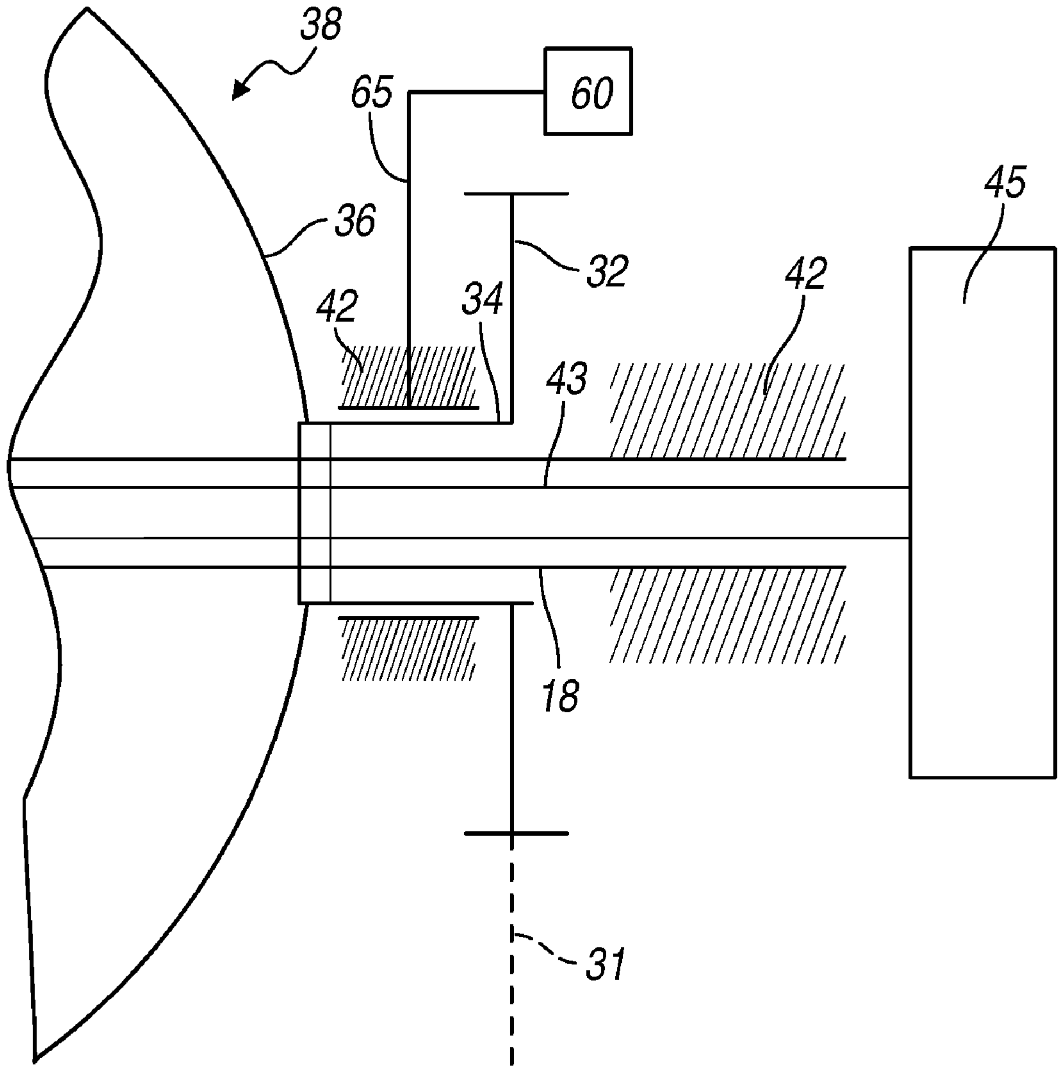
FIG. 2 is schematic diagram showing a connection between the impeller and pulley of FIG. 1.

FIG. 2 shows a stator shaft 18, to which the stator wheel of the torque converter 38 is secured, fixed against rotation on a housing 42. A transmission input shaft 43 driveably connects the turbine wheel of the torque converter 38 to a forward clutch 45.

The stator 40 of pump 12 is secured against rotation to the transmission housing 42. The coil 44 of the electric motor/alternator 24 is integrated in the stator 40.

Figure 3:
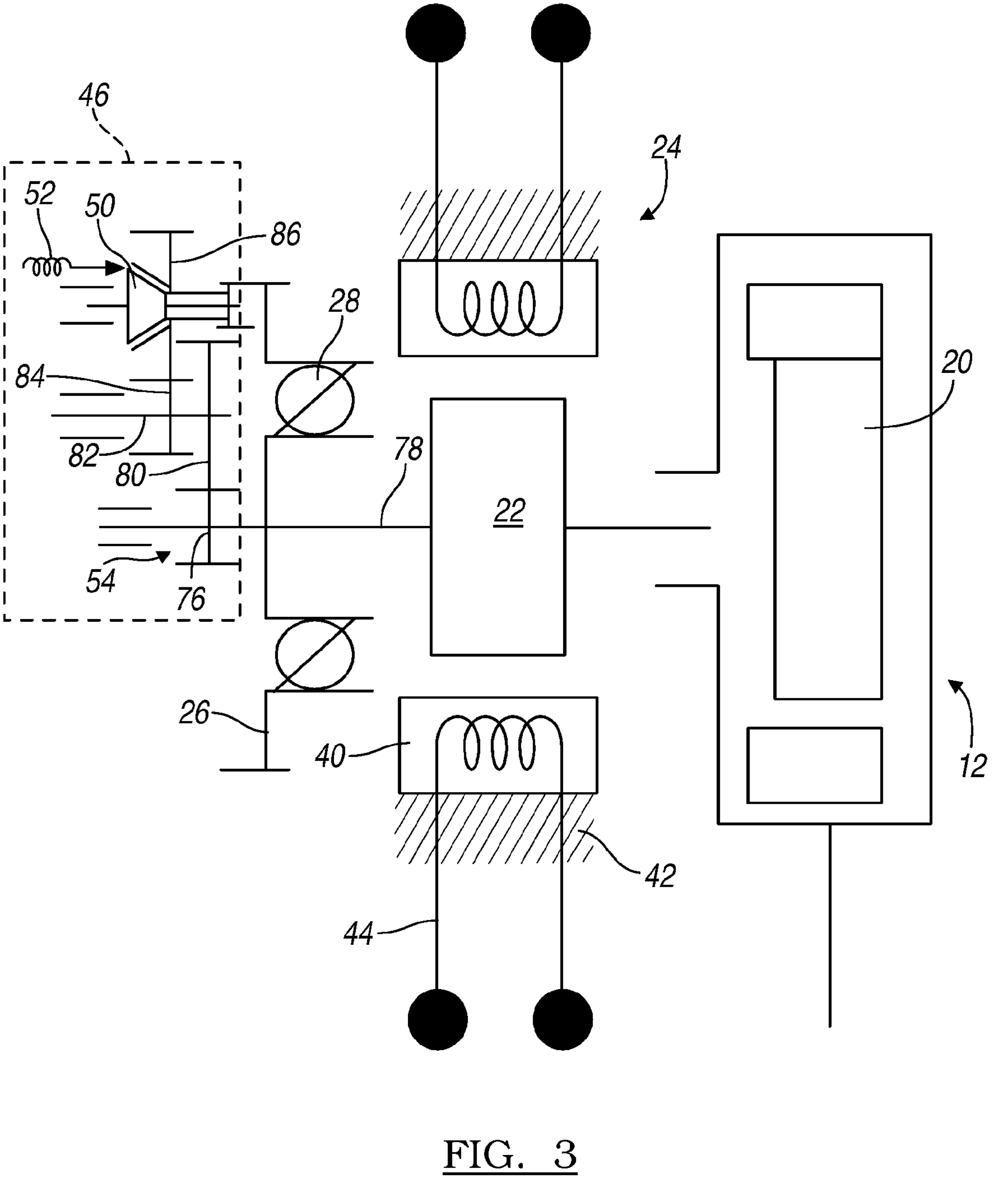
FIG. 3 is schematic diagram showing the pump, motor and alternate power paths for driving the pump.

An optional electrically activated start-up module 46, shown in FIG. 3, includes a sliding gear coupling 50, actuated by a solenoid 52, which allows torque to be transmitted at a variable magnitude through a speed reduction-torque amplification drive mechanism 54, which transmits torque from electric motor 24, to input shaft 34 when the sliding gear coupling 50 is engaged.

An electronically controlled flow servo valve 60 (or a solenoid and regulating valve 16) are installed into a lubrication circuit 62, which includes a cooler 64, in which heat is transferred from the transmission fluid to the ambient atmosphere. The flow servo valve 60 (or a solenoid and regulating valve 16) are supported on and secured to a support hub 65, which is fixed to housing 42.

The transmission system 10 is configured to perform in four operating modes.

The transmission system 10 can be operated in a pump mode with torque being transmitted through a power path that includes an engine 70, torque converter 36, shaft 34, the belt drive mechanism 30, OWC 28 and the pump rotor 20. When operating in the pump mode, the electric motor/alternator 24 is disabled electronically and the pump 12 is driven by the engine 70.

The transmission system 10 can be operated with the pump 12 driven only by the electric motor 24 during engine start-up or at low engine speed. In this mode, the electric motor/alternator 24 drives pump 12 at a higher speed than the speed of input shaft 34; therefore, the OWC 28 overruns and the speed reduction gearing 54 transmits no torque. The engine 70 is cranked by a starting motor 66 through a starting gear 67 and flywheel 68. Pump displacement is adjusted to match expected pump torque and the required transmission fluid flow rate.

The transmission system 10 can also be operated in the pump mode with the motor/alternator 24 operating as an electric generator. The pump is driven by the engine 70 through the power path that includes torque converter 36, shaft 34, the belt drive mechanism 30, OWC 28 and the pump rotor shaft 78. Electric current generated by the generator 24 is routed to the vehicle's charging system, thus providing an alternative method for recharging the vehicle's battery. This mode of operation eliminates need for a separate alternator.

The transmission system 10 can be operated in start-up mode to crank the engine 70 using torque produced by the motor/alternator 24 upon electrically actuating the engine start-up module 46 and causing the electric machine 24 to operate as a motor. The OWC 28 is locked. Motor torque is amplified by the torque amplification drive mechanism 54, located in the start-up module 46, and the amplified torque is transmitted through the belt drive mechanism 30 and coupling 50 to the engine 70 while starting the engine. Servo flow valve 60 is used to temporarily minimize the flow rate required by pump 12. Pump flow control solenoid 74 is used to optimize pump torque and flow rate to provide minimum required system hydraulic pressure.

The gear mechanism 54 includes a first pinion 76 secured to the rotor shaft 78, a first gear 80 meshing with pinion 76 and secured to a layshaft 82, a second pinion 84 secured to layshaft 82, and a second gear 86 meshing with pinion 84 and releasably connected to pulley 26 by the sliding gear coupling 50. Mechanism 54 amplifies torque transmitted from the motor/alternator 24 to pulley 26, and it reduces torque transmitted from pulley 26 to the motor/alternator 24.

The system 10 can operate in the electric generation mode for limited regeneration braking if an extra capacity battery is used to provide limited assist to engine torque for accelerating the vehicle. This regeneration braking mode of operation is only possible with electronic control including pressure feedback control. Braking can be only done when engine speed is greater than a critical speed for flow demand, i.e. greater than about 1300 rpm, and then switching to electric drive or engine drive with some transient cooler flow reduction. In the regeneration braking mode the OWC 28 is on.

Figure 4:
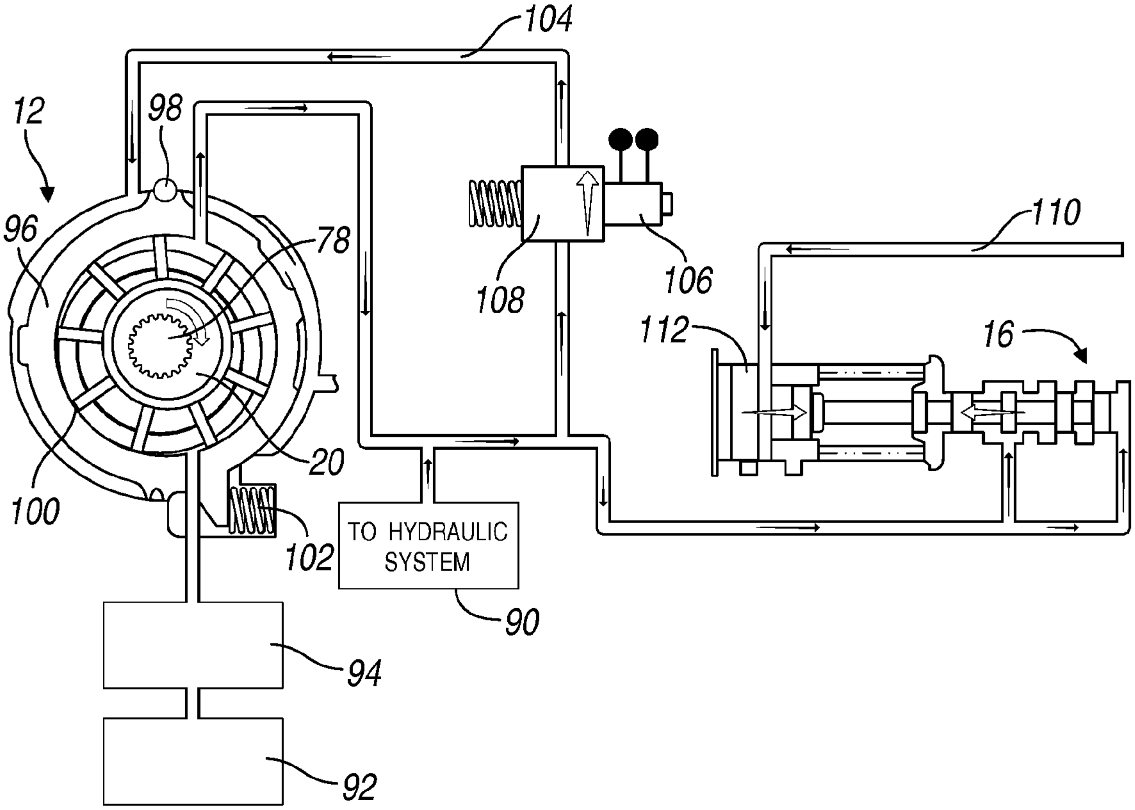
FIG. 4 is a schematic diagram showing a variable displacement pump and a valve that regulates pump flow delivery.

Refer now to FIGS. 1 and 4 wherein the variable displacement hydraulic vane pump 12 supplies fluid flow to the transmission system 90. The pump 12 is supplied with fluid from an oil sump 92 through a filter 94. The outer tips of the vanes 100 maintain contact with the ring 96. The displacement of the pump 12 varies in response to pivoting of a ring 96 about a pivot pin 98 relative to the pump rotor 20. Spring 102 tends to increase pump displacement, and feedback pressure in line pressure 104 tends to decrease pump displacement.

An electronically controlled variable force solenoid (VFS) 106 and pressure regulating valve 108 regulate the magnitude of pressure in line 104.

Pressure in line 110, from an electronically controlled VFS, is supplied to a main regulator boost valve 112. Line pressure is supplied to the main regulator valve 16.

In accordance with the provisions of the patent statutes, the preferred embodiment has been described. However, it should be noted that the alternate embodiments can be practiced otherwise than as specifically illustrated and described.

The invention claimed is:

1. A drive system for a motor vehicle transmission, comprising:
- a shaft for a hydraulic transmission pump;
- an engine driveably connected to the shaft;
- a motor/alternator secured to the shaft;
- a drive mechanism producing a one-way drive connection between the engine and the shaft, amplifying torque produced by the motor/alternator, and transmitting said amplified torque to the engine.

2. The system of claim 1 wherein the drive mechanism further comprises:
- a first pulley driveably connected to the engine;
- a second pulley;
- a belt or chain engaging the first pulley and the second pulley;
- a clutch producing a one-way drive connection between the shaft and the second pulley.

3. The system of claim 2 further comprising a starting motor driveably connected to the engine.

4. The system of claim 1 wherein the drive mechanism further comprises:
- a first pulley driveably connected to the engine;
- a second pulley;
- a belt or chain engaging the first pulley and the second pulley;
- gearing including a first pinion secured to the shaft, a first gear meshing with the first pinion and secured to a layshaft, a second pinion secured to the layshaft, and a second gear meshing with the second pinion;

a coupling for releasably connecting the second gear and the second pulley.

5. The system of claim 1 wherein the drive mechanism further comprises:

a belt drive for transmitting torque produced by the engine to the shaft; and speed reduction gearing arranged in series with the belt drive between the engine and the shaft for amplifying torque produced by the motor/alternator and transmitting the amplified torque to the engine.

6. The system of claim 1 wherein the drive mechanism further comprises:

a belt drive for transmitting torque produced by the engine to the shaft; and a clutch producing the one-way drive connection between the shaft and the engine;

speed reduction gearing arranged in series with the belt drive between the engine and the shaft for amplifying torque produced by the motor/alternator and transmitting the amplified torque to the engine.

7. A system for a motor vehicle transmission, comprising:

an engine;

a motor/alternator;

a hydraulic pump shaft secured to the motor/alternator and driveably connected to the engine;

a first pulley driveably connected to the engine;

a second pulley driveably connected to the shaft;

a drive member engaging the first and second pulleys;

a clutch producing a one-way drive connection between the second pulley and the shaft.

8. The system of claim 7 further comprising a starting motor driveably connected to the engine.

9. The system of claim 7 further comprising a torque converter driveably connected to the engine and the first pulley.

10. The system of claim 7 further comprising:

gearing including a first pinion secured to the motor/alternator, a first gear meshing with the first pinion and secured to a layshaft, a second pinion secured to the layshaft, and a second gear meshing with the second pinion;

a coupling for releasably connecting the second gear and the second pulley.

11. The system of claim 7 further comprising:

speed reduction gearing driveably connected to the second pulley for amplifying torque produced by the motor/alternator and transmitting the amplified torque to the engine through the drive member and the first pulley.

12. A system producing pressurized fluid for a motor vehicle transmission, comprising:

a hydraulic pump;

an engine;

a starting motor driveably connected to the engine a starter/alternator driveably connected to the pump;

speed reduction gearing for amplifying torque produced by the starter/alternator and transmitting the amplified torque to the engine.

13. The system of claim 12 further comprising a clutch producing a one-way drive connection between the starter/alternator and the engine.

14. The system of claim 12 further comprising a torque converter driveably connected to the engine, the pump and the starter/alternator.

15. The system of claim 12 wherein the gearing includes:

a first pinion secured to the starter/alternator, a first gear meshing with the first pinion and secured to a layshaft, a second pinion secured to the layshaft, and a second gear meshing with the second pinion.

16. The system of claim 15 further comprising a coupling for releasably connecting the second gear and the engine.

* * * * *